Oct. 6, 1959  D. McNICOLL  2,907,143
MEANS FOR LAPPING THRUST RIBS OF TAPERED ROLLER BEARINGS
Filed Dec. 23, 1957  3 Sheets-Sheet 1

Inventor
David McNicoll
By
Patent Agent

Oct. 6, 1959  D. McNICOLL  2,907,143
MEANS FOR LAPPING THRUST RIBS OF TAPERED ROLLER BEARINGS
Filed Dec. 23, 1957  3 Sheets-Sheet 2

Inventor
David McNicoll
By (signature)
Patent Agent.

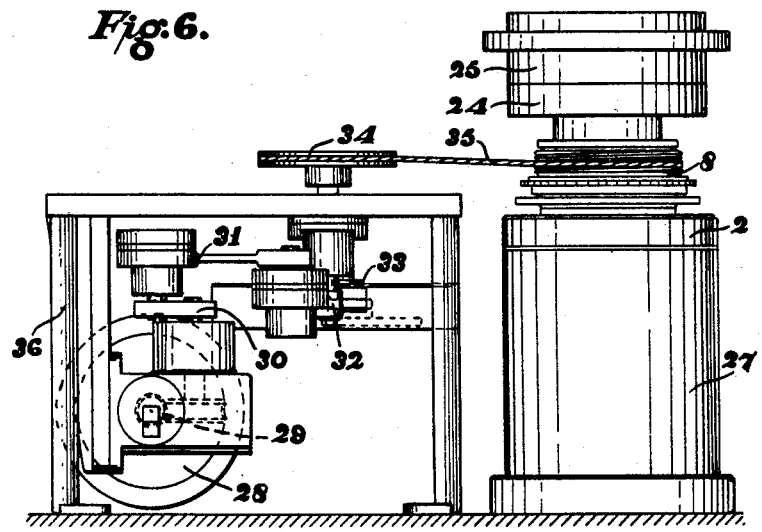
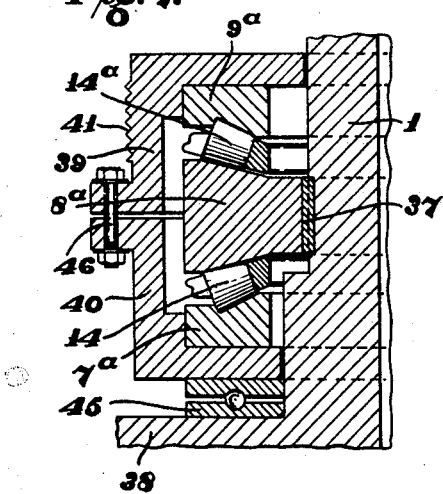
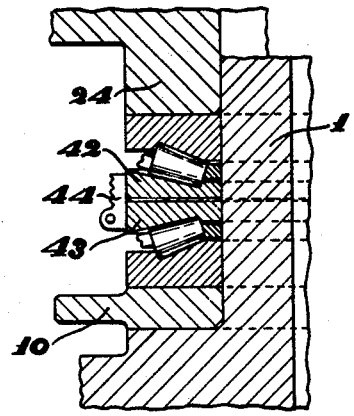

United States Patent Office 2,907,143
Patented Oct. 6, 1959

2,907,143

MEANS FOR LAPPING THRUST RIBS OF TAPERED ROLLER BEARINGS

David McNicoll, Aston, Birmingham, England, assignor to British Timken Limited, Birmingham, England, a British company Application December 23, 1957, Serial No. 704,618

Claims priority, application Great Britain February 22, 1957

4 Claims. (Cl. 51—58)

This invention relates to a means for profiling or re-profiling the thrust ribs of the race members of tapered roller bearings, such ribs being in the nature of flanges that are normally provided on one or more of the race members of a tapered roller bearing for co-operation with the larger ends of the tapered rollers in order to resist the end thrust of said rollers.

In the case of certain kinds of tapered roller bearings, such as bearings which have to carry high thrust loads with oscillatory movement, the practice hitherto followed, for profiling the thrust rib, has been first to grind the rib to the approximate profile desired, and then to generate the exact profiile of the final desired form by honing or lapping the rib by means of a set of slave rollers carried in a slave cage and driven round by rotation of at least one of the bearing race members whilst under axial pressure, a considerable number of rollers being used in each set.

With this known method of profiling, the rib profile which is generated cannot easily be made to correspond exactly to the form of the ends of the slave rollers which produce the lapping effect, and repeated operations are necessary for the production of the desired form. This is due mainly to the fact that, because of unavoidable inequalities in roller diameter, it is not possible to get equal pressure distribution over all the lapping rollers, with the result that those rollers which are carrying the major part of the pressure applied to the races, lap actively while rolling round the tracks in the approximate geometric position which corresponds to true rolling, whereas the rollers which are not carrying high load tend to be merely dragged round by the slave cage and come into intermittent contact with the rib, creating an uncontrolled lapping effect which tends to produce uncontrollable variations in the rib profile.

This defect cannot be remedied by increasing the axial load because the d'fference in the cutting effect and lapping position of high-diameter and low-diameter rolls remains, irrespective of the load. It is also not practicable to get rollers of exactly equal size. Moreover, if excessive lapping pressures are applied, the drag of the cutting effect on the rib becomes so great that the lapping rolls are skewed seriously out of position and the error in reproduction of the roll end profile on the rib becomes exaggerated. Furthermore, any skewing that does take place tends to be cumulative during continuous rotation of a race member.

An object of the present invention is to provide an improved means for profiling or re-profiling the thrust ribs of tapered roller bearings which, although using slave rollers, obviates the need for using slave rollers all of exactly the same diameter and which avoids the disadvantage of a cumulative skewing eflect, thereby overcoming the main disadvantages of the said known procedure. A further object is to provide means for carrying out the profiling method whereby the pressure on the rollers and the lapping pressure can be easily controlled and also, whereby the amount of stock removed from the rib can be readily controlled.

Another object of the invention is to provide a simple form of device for carrying out the profiling method, which device can be adapted for hand operation to enable used bearings to have their thrust ribs readily re-profiled, as a matter of maintenance routine, by the users of the bearings or by servicing establishments.

According to the invention, a method of lapping a thrust rib of a race member of a tapered roller bearing to a predetermined profile, by causing tapered slave rollers of predetermined end profile to be driven around the bearing race members by rotary motion imparted to at least one race member under axial pressure, is characterised by the fact that only three equally-spaced lapping rollers are employed being mounted in a carrying device or cage, and by the fact that the said race member is oscillated so as to cause the slave rollers repeatedly to travel through at least 120° about the bearing axis, first in one direction and then in the reverse direction.

The rotary motion imparted to the said race member may be an oscillatory motion for a portion of a revolution, first in one direction and then in the other, or it may be one or more complete revolutions, first in one direction and then in the other. The three slave rollers are conveniently carried in pockets or housings equally spaced around a loose slave cage member disposed between two race members of the bearing.

Also, according to the invention, a lapping device for profiling a thrust rib of a race member of a tapered roller bearing comprises a carrier cage or ring having three equally-spaced pockets containing three tapered rollers having ends of predetermined profiile, said cage or ring being adapted to be inserted between the races of the tapered roller bearing to be profiled in place of the normal roller and cage assembly, the device also including means for enabling assembly under an axial load of the bearing race members with said carrier cage or ring between pairs of said members such that a rotary motion may be imparted to at least one of the race members.

Also, according to the invention a device for lapping to a predetermined profile a thrust rib of a race member of a tapered roller bearing comprises an upstanding pillar over which the component race members of the bearing can be placed and assembled so that at least one of said race members is rotatable thereon, an abutment member towards the lower end of said pillar adapted to support one of said race members assembled upon said pillar, a carrier cage having three equally-spaced pockets containing three tapered slave rollers having ends of predetermined profile, said carrier cage being adapted to be positioned between a pair of the bearing race members upon said pillar, and means for applying an axial load to the assembled race members and rollers upon said pillar. The means for applying the axial load may comprise a weighted sleeve slidably mounted on the upper part of the pillar.

The carrier cage or ring, or a separate ring, may be fitted with compressible pads for removing lapping material from the race tracks.

By way of example, a convenient manner and means for carrying out the invention will be described, with reference to the accompanying drawings, primarily in connection with a two-row roller thrust bearing comprising two outer race rings each having a thrust rib at its outer peripheral portion, an intermediate race ring, and two rows of tapered rollers interposed, respectively between the intermediate ring and the outer race rings.

In the said drawings,

Figure 6 illustrates a mechanical means of operating the device.

Figure 7 is a fragmentary sectional view showing a modification.

Figure 8 is a fragmentary sectional view showing a means of lapping the thrust ribs of single row tapered roller bearings.

Figure 1:
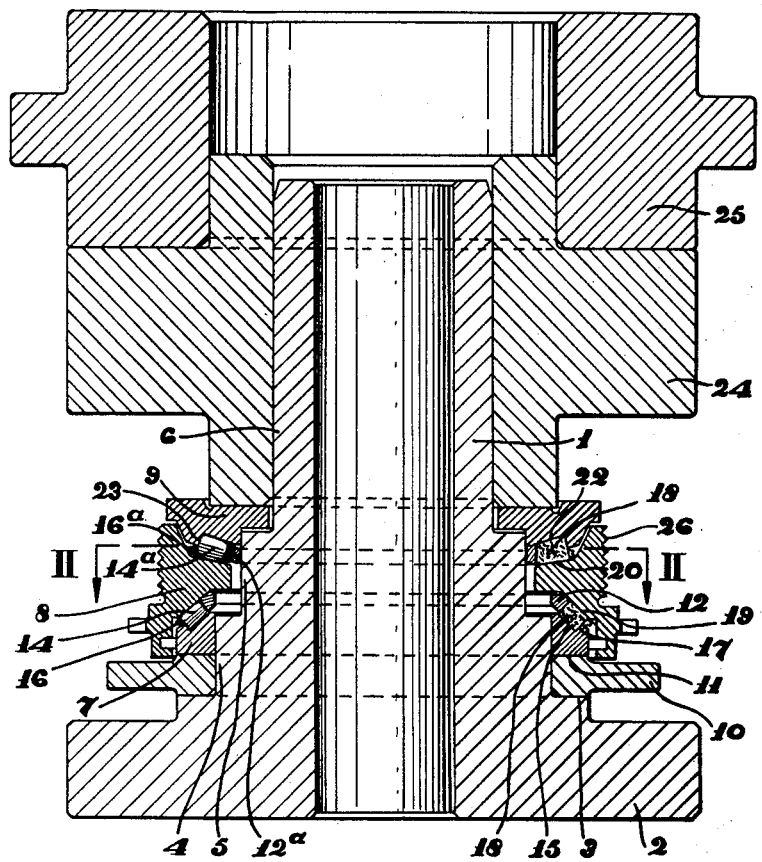
Figure 1 is a vertical section showing one form of device according to the invention, which is suitable for hand operation for carrying out the lapping process.
Figure 3:
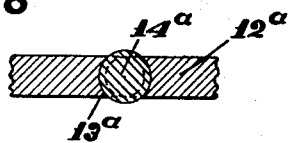
Figures 3 and 4 are, respectively, sectional views, on lines III—III and IV—IV of Figure 2.
Figure 4:
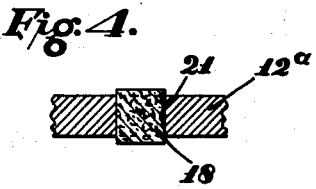
Figure 2:
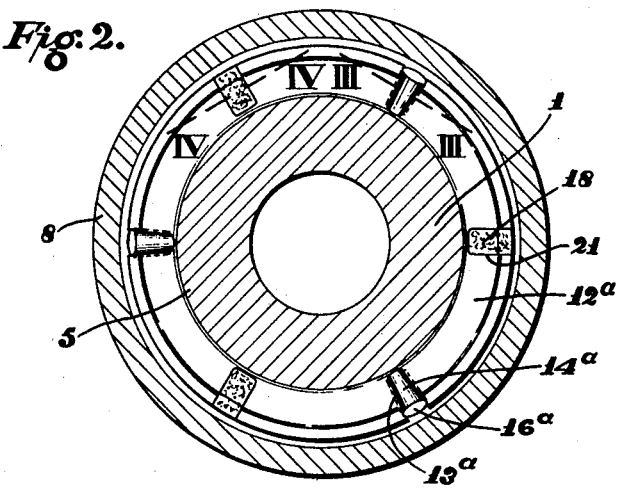
Figure 2 is a horizontal section on line II—II of Figure 1.
Figure 5:
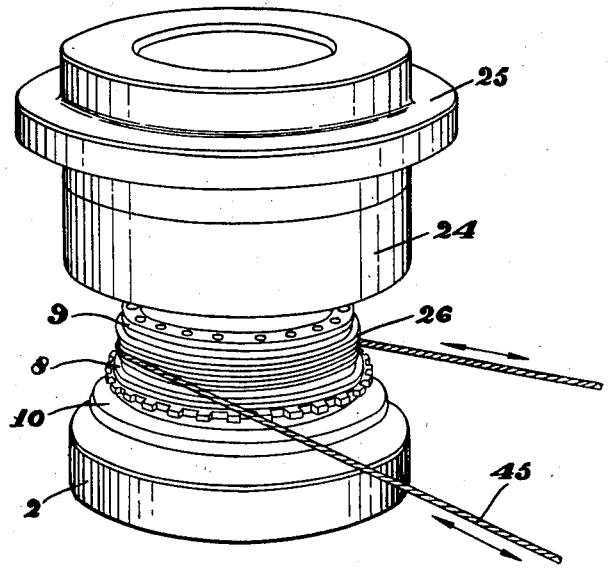
Figure 5 is a perspective view of the device in operation.

Referring more particularly to Figures 1 to 5 of the drawings, the device illustrated therein comprises an upright cylindrical pillar or post 1 formed with an integral base 2 and a lower abutment shoulder 3, the lower part of said pillar or post being stepped so as to provide sections 4, 5 and 6 of different diameters to suit the different internal diameters or bores of the race members 7, 8 and 9 of the bearing for which the device is intended. Upon the lower abutment shoulder 3 is placed a collar or ring 10 slidably mounted over the lower large diameter section 4 of the post 1, the top face 11 of said ring 10 being adapted to support the lower race member 7 of the bearing. Over this race member 7 positioned on the ring 10 is placed an annular slave cage 12 having in it three tapered pockets or housings containing three tapered slave rollers 14 of a form similar to those to be employed in the completed bearing, so that these three rollers 14 are equally spaced around the race 15 of the race member 7. The rollers 14, whilst supported on the race surface 15, are free to move axially so that their ends 16 can engage and co-operate with the thrust rib 17 on the race member 7. These ends 16 are spherically or convexly curved or otherwise shaped to correspond to the form to which it is desired to lap the rib. Placed over the slave cage 12 and rollers 14 is the intermediate race ring 8 which has a bore of greater diameter than the intermediate section 5 of the post 1. The lower race surface 19 of the intermediate race ring 8 rests on the three rollers 14, whilst the upper race surface 20 supports another slave cage 12ª and slave rollers 14ª contained in three equally-spaced pockets 13ª. The slave cages 12 and 12ª are also each formed with three equally-spaced parallel-sided pockets 21 in which are contained compressible pads 18 of felt or like material which, during the lapping operation as hereinafter described, serve to polish and to wipe lapping material off the race tracks and thrust ribs.

On top of the second set of slave rollers 14ª is placed the upper outer race member 9 of the bearing; this member 9 fitting closely around the section 5 of the post 1 and having a raceway 22 resting on the rollers 14ª and a thrust rib 23 which is engaged, under axial load, by the ends 16ª of said rollers 14ª.

Mounted upon the upper reduced diameter section 6 of the post 1 is a sleeve member 24 which is free to slide axially and which normally rests upon the upper race member 9. A further relatively heavy annular member 25 fits on top of the sleeve 24 and the members 24 and 25 together serve to apply an axial load to the assembled race members and slave rollers.

In carrying out the lapping operation in accordance with the invention, the bearing race members are assembled together with the slave rollers in the lapping device, as hereinabove described, and the intermediate race member 8 is then given a repeated oscillatory rotary motion, first in one direction for a portion of a revolution and then in the opposite direction for a portion of a revolution so that the slave rollers are caused to travel through at least 120° about the bearing axis. During this oscillation a lapping medium is applied to the thrust ribs 17 and 23 of the outer races 7 and 9 and to the slave-roller ends, and under the combined influence of the rotary motion and axial pressure the slave rollers 14 and 14ª roll backwards and forwards over the race surfaces, their large ends 16 and 16ª engaging and co-operating with the said thrust ribs with a relatively light pressure so as to remove metal from the faces of the ribs until the profiles of the flanges correspond to the profile of the roller ends.

The race member 8 in the present case is formed with an outer peripheral screw thread or grooves 26, and although it may be oscillated by any desired means, for hand operation such as would be performed by the user or in a servicing establishment, it is convenient to wrap a cord 45 (see Figure 5) around the outside threaded portion 26 and, by holding one free end of the cord in each hand, an operator may, by pulling first on one end and then on the other, impart the desired rotary oscillation.

Instead of the race ring 8 being merely oscillated through a part of a complete revolution, it may be alternately rotated through one or more complete revolutions in one direction and then through an equal number of revolutions in the opposite direction, this motion being repeated as many times as may be necessary.

By the improved profiling method, the use of a relatively large number of lapping rollers corresponding approximately to the number of rollers in the completed bearing, and the use of a uni-directional rotary motion is abandoned, and lapping of each thrust rib is carried out by means of three equally-spaced rollers only which are applied to the rib by a relatively light pressure on the bearing races and an oscillatory or semi-rotary motion of these races. The effect of the use of three rollers lightly applied with a semi-rotary motion to the rib is four-fold: First, the pressure on each roller closely approximates to one-third of the axial pressure applied to the bearing and, therefore, can be easily controlled. The slight variations in this pressure due to the small variations in diameter of the lapping rollers which are inseparable from ordinary roller manufacture, are relatively negligible with no effect on the lapping process, and it is thereby quite unnecessary to grade or classify these lapping rollers into sets of nearly equal diameter. Secondly, the lapping pressure between the slave roller end and the thrust rib being relatively light and easily controlled, ensures that the deviation of the roller, during the lapping operation, from the geometric position which corresponds to true rolling, i.e., the amount of skew which is imparted to the roller during lapping, is extremely small; thus when rotation takes place in one direction, there is only a very slight deviation between the contour which is lapped on to the rib and the contour of the lapping roller. Thirdly, by adopting the device of reversing the direction of rotation during every partial revolution of the bearing member, the errors due to skewing are almost entirely cancelled out and a rib is produced which, for all practical purposes, conforms to the profile used on the roller end. Fourthly, since only three rollers are cutting during the lapping operation under conditions of known pressure between roller end and rib, the amount of stock removed from the rib can be readily controlled by appropriate control of the axial pressure applied to the bearing and the number of to-and-fro oscillations which are imparted during any one lapping operation.

A convenient arrangement for operating the device by power-driven means is illustrated in Figure 6, such arrangement being generally suitable for profiling of the thrust ribs of new bearings by the manufacturers.

Referring to Figure 6, the base 2 of the lapping device is shown as being mounted on a pedestal 27 so as to bring it to a convenient height, whilst the power-driven operating means is mounted on an adjacent frame 36 and comprises a motor 28 coupled through gearing 29, a crank 30, and linkages 31 and 32 to oscillating gear 33 which drives a pulley 34 operatively connected by a cord or belt 35 to the rotatable intermediate race ring 8 of the bearing.

In a modification, as shown in Figure 7, an intermediate race ring 8a may be held stationary between outer race rings 7a and 9a, whilst the oscillatory motion is imparted to the latter. In this case, the intermediate race ring 8a fits closely around the post 1 and is keyed thereto by a key 37. The outer race rings 7a and 9a are conveniently clamped together by clamping rings 39 and 40, and they are rotatably supported upon a base part 38 by means of an anti-friction bearing 45. Grooves 41 provided on the outer periphery of the upper clamping ring 39 serve to receive a cord or belt for performing the oscillatory motion as hereinbefore described. A controlled axial load is readily applied to the roller 14 and 14a in this case by tightening up the clamping rings 39 and 40 towards one another by means of clamping bolts 46.

Where it is desired to profile the thrust ribs of a single row roller bearing, a single slave cage provided with slave rollers would be fitted between the two outer race rings of the bearing, and the oscillatory rotary motion would be imparted to one of said race rings. This is most conveniently performed by arranging for two similar bearings to be lapped at the same time so that they may be assembled in the lapping device, as shown in Figure 8, with adjacent race rings 42 and 43 clamped together by an outer clamping ring 44. The clamping ring 44 may then be rotated by a cord as with the previous arrangements and the lapping of the two bearings is done simultaneously. Alternatively, one bearing carrying the clamping ring 44 may be kept specially for the purpose of facilitating the mounting of single row roller bearings that require re-profiling.

I claim:

1. A device for lapping a thrust rib of a race member of a tapered roller bearing to a predetermined profile, comprising means for supporting the race rings of the bearing, at least one ring having a thrust rib, in superimposed axially-aligned relation; a circular carrier cage having three equally-spaced pockets therein, adapted to be interposed between said race rings; only three tapered slave lapping rollers, of predetermined end profile, freely mounted in the said respective pockets so that the larger ends of the rollers can engage the thrust rib of a race ring; means for applying an axial load to the race rings when assembled with the cage and slave rollers between them; and means whereby one of the race rings may be rotatably oscillated first in one direction and then in a reverse direction to cause each of the slave rollers to travel through at least 120° about the common axis of the race rings.

2. A device for lapping to a predetermined profile a thrust rib of a race member of a tapered roller bearing, comprising an upstanding pillar of stepped form with portions of different diameters and over which the component race members of the bearing can be threaded and assembled so that at least one of said race members is rotatable about the pillar; an abutment towards the lower end of said pillar adapted to support one of the said race members; a carrier cage having three equally-spaced pockets respectively containing only three tapered slave rollers having large ends of predetermined profile, said carrier cage being adapted to be positioned between a pair of the bearing race members, means for applying an axial load to the assembled race members and slave rollers, and means for imparting an oscillating rotary motion to one of the race members.

3. A device for lapping to a predetermined profile a thrust rib of a race member of a tapered roller bearing, comprising an upstanding pillar of stepped form with portions of different diameters and over which the component race members of the bearing can be placed and assembled so that at least one of said race members is rotatable thereon; an abutment at the lower portion of the pillar adapted to support one of the said race members; a carrier cage having three equally-spaced pockets; only three tapered slave rollers, having large ends of predetermined profile, housed within the respective pockets, said carrier ring being adapted to be positioned between a pair of the bearing race members; a weighted sleeve slidably mounted on the upper portion of the upstanding pillar above the stepped portions and adapted to be supported by the assembled race members of the bearing, and means for imparting a rotary oscillating motion to one of said race members.

4. A device for lapping to a predetermined profile a thrust rib of a race member of a tapered roller bearing, comprising an upstanding pillar over which the component race members of the bearing can be placed and assembled so that at least one of said race members is rotatable thereon; an abutment at the lower portion of the pillar adapted to support one of said race members; a carrier cage having three equally-spaced pockets respectively containing only three tapered slave rollers having large ends of predetermined profile, said carrier ring being adapted to be positioned between a pair of the bearing race members; a plurality of circumferentially-spaced compressible pads fitted in openings provided in the carrier ring between pockets containing the slave rollers, said pads being adapted to polish and remove lapping material from the race tracks of the bearing race members during the lapping operation; and means for applying an axial load to the assembled race members and slave rollers.

References Cited in the file of this patent

UNITED STATES PATENTS 2,290,541  Cramer _____ July 21, 1942